United States Patent
Borgstrom et al.

[11] Patent Number: 6,155,574
[45] Date of Patent: Dec. 5, 2000

[54] SEALING DEVICE

[75] Inventors: Leonard Borgstrom, Tyreso; Claes Goran Carlsson; Peter Franzen, both of Tullinge; Claes Inge, Saltsjo-Duvnas; Torgny Lagerstedt, Stockholm; Hans Moberg, Stockholm; Stefan Szepessy, Stockholm; Mikael Sundstrom, Stockholm, all of Sweden

[73] Assignee: Alfa Laval AB, Tumba, Sweden

[21] Appl. No.: 08/958,384

[22] Filed: Oct. 27, 1997

[30] Foreign Application Priority Data

Nov. 5, 1996 [SE] Sweden .................................. 9604054

[51] Int. Cl.⁷ .................................................. F16J 15/447
[52] U.S. Cl. ............................................ 277/419; 277/928
[58] Field of Search .................................... 277/412, 418, 277/419, 420, 928

[56] References Cited

U.S. PATENT DOCUMENTS

| | | | |
|---|---|---|---|
| 3,659,662 | 5/1972 | Dicky | 277/420 |
| 4,973,063 | 11/1990 | Korenblit | 277/348 |
| 5,024,364 | 6/1991 | Nash | 277/364 |
| 5,026,075 | 6/1991 | Massarani . | |
| 5,028,054 | 7/1991 | Peach | 277/348 |
| 5,085,443 | 2/1992 | Richards | 277/53 |
| 5,222,742 | 6/1993 | Roberts | 277/420 |
| 5,347,189 | 9/1994 | Chuta | 277/419 |
| 5,676,472 | 10/1997 | Solomon et al. | 384/607 |

FOREIGN PATENT DOCUMENTS

| | | |
|---|---|---|
| 0 326 909 | 8/1989 | European Pat. Off. . |
| 2 128 693 | 5/1984 | United Kingdom . |
| 2 157 373 | 10/1985 | United Kingdom . |

*Primary Examiner*—B. Dayoan
*Assistant Examiner*—Alison K. Pickard
*Attorney, Agent, or Firm*—Fish & Richardson P.C.

[57] ABSTRACT

A sealing device (4) is provided for sealing between a first member (1) and a second member (2) and comprises a first sealing element (10), provided on the first member and extending thereabout towards the second member, and a second sealing element (20), provided on the second member and extending towards the first member without direct contact with the first sealing element (10). The first sealing element (10) comprises a first flange member (12) extending towards the first member (1) forming a first chamber (13) and the second sealing element (20) comprises a second flange member (22) extending towards the second member (2) and forming a second chamber (23). The flange members (12, 22) are provided overlapping each other in such a manner that the first flange member (12) extends in the second chamber (23) and the second flange member (22) extends in the first chamber (13).

15 Claims, 5 Drawing Sheets

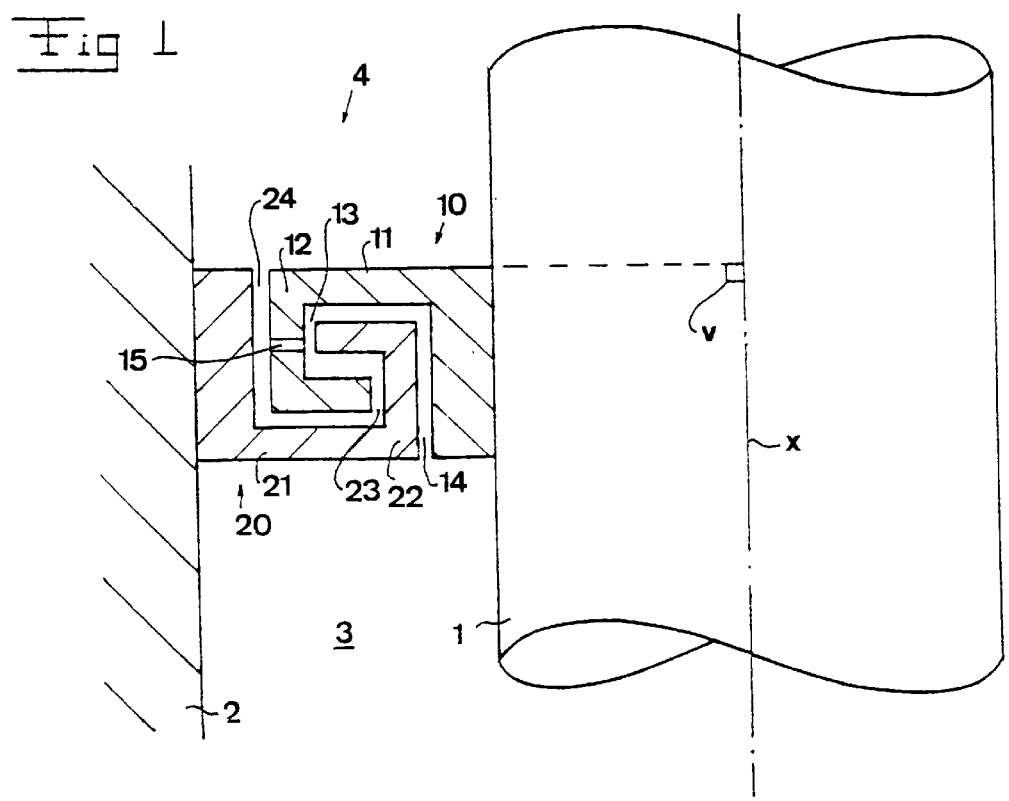
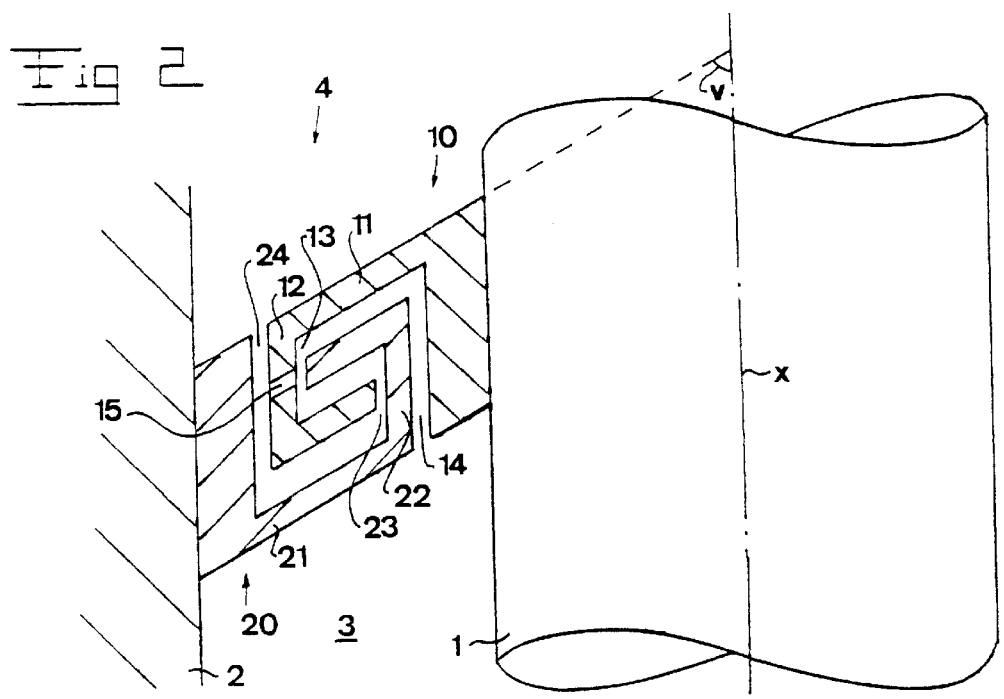

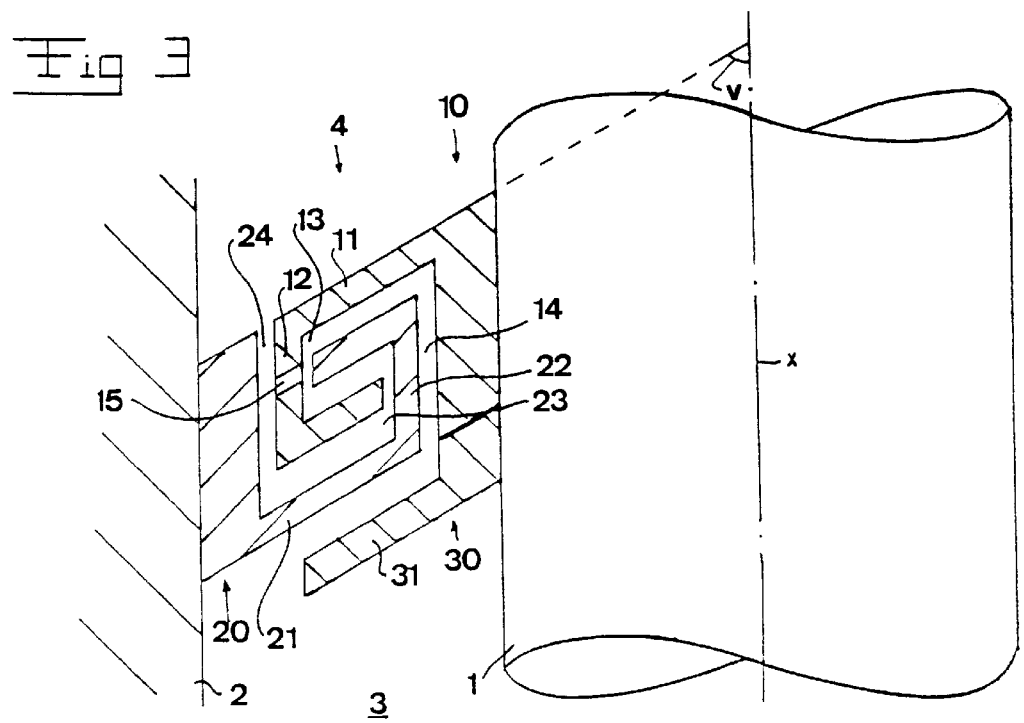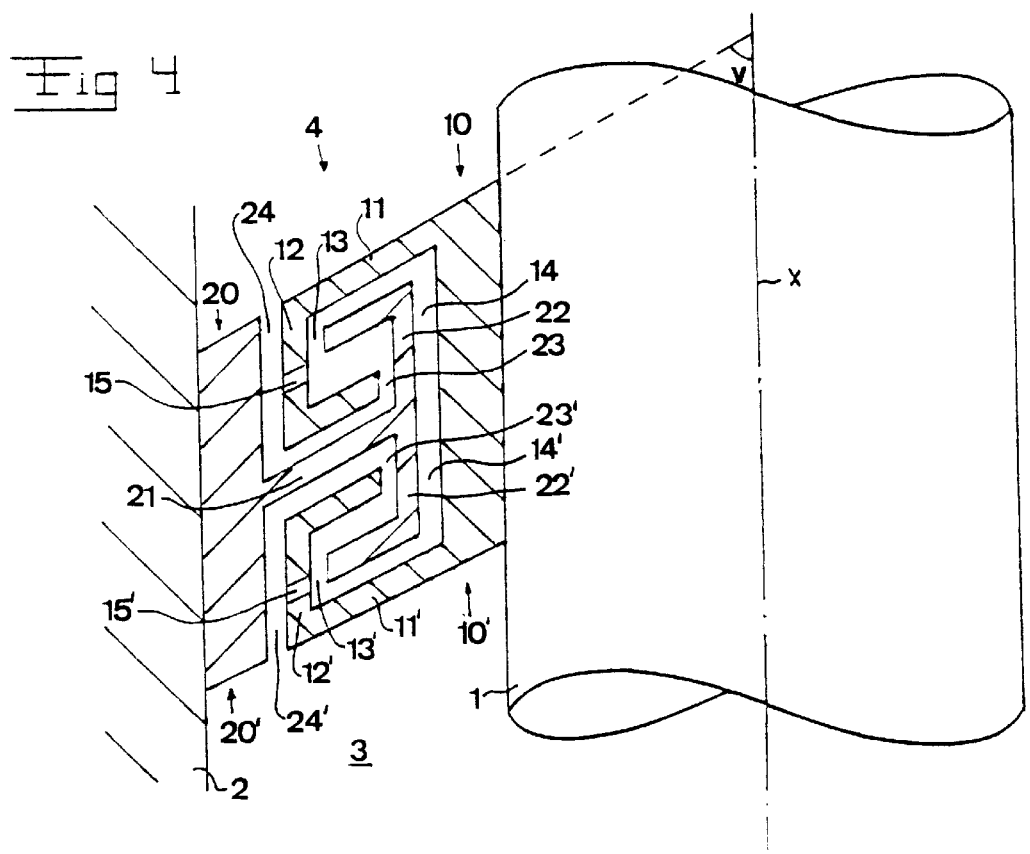

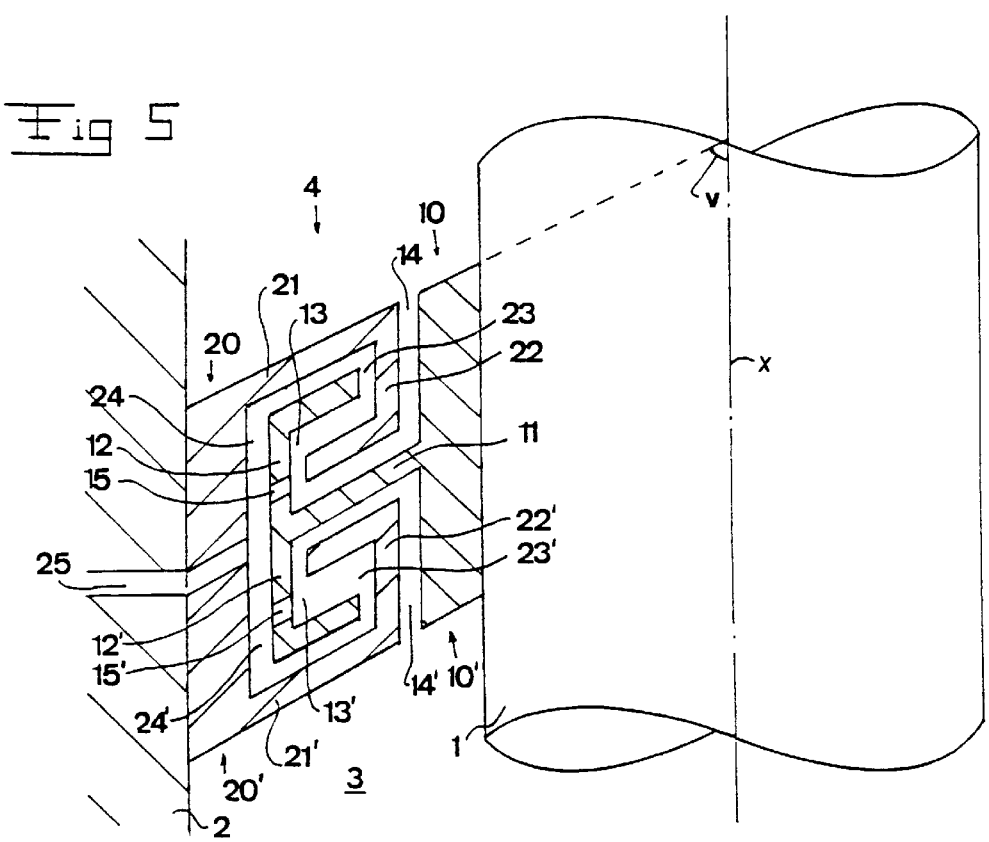
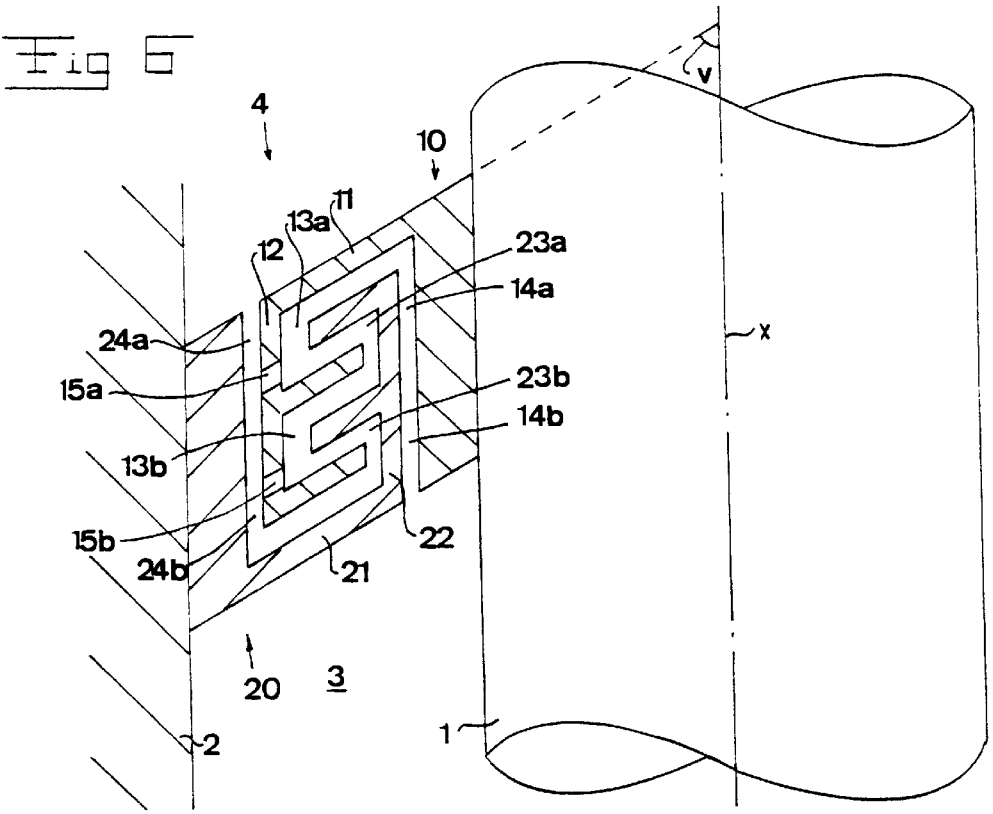

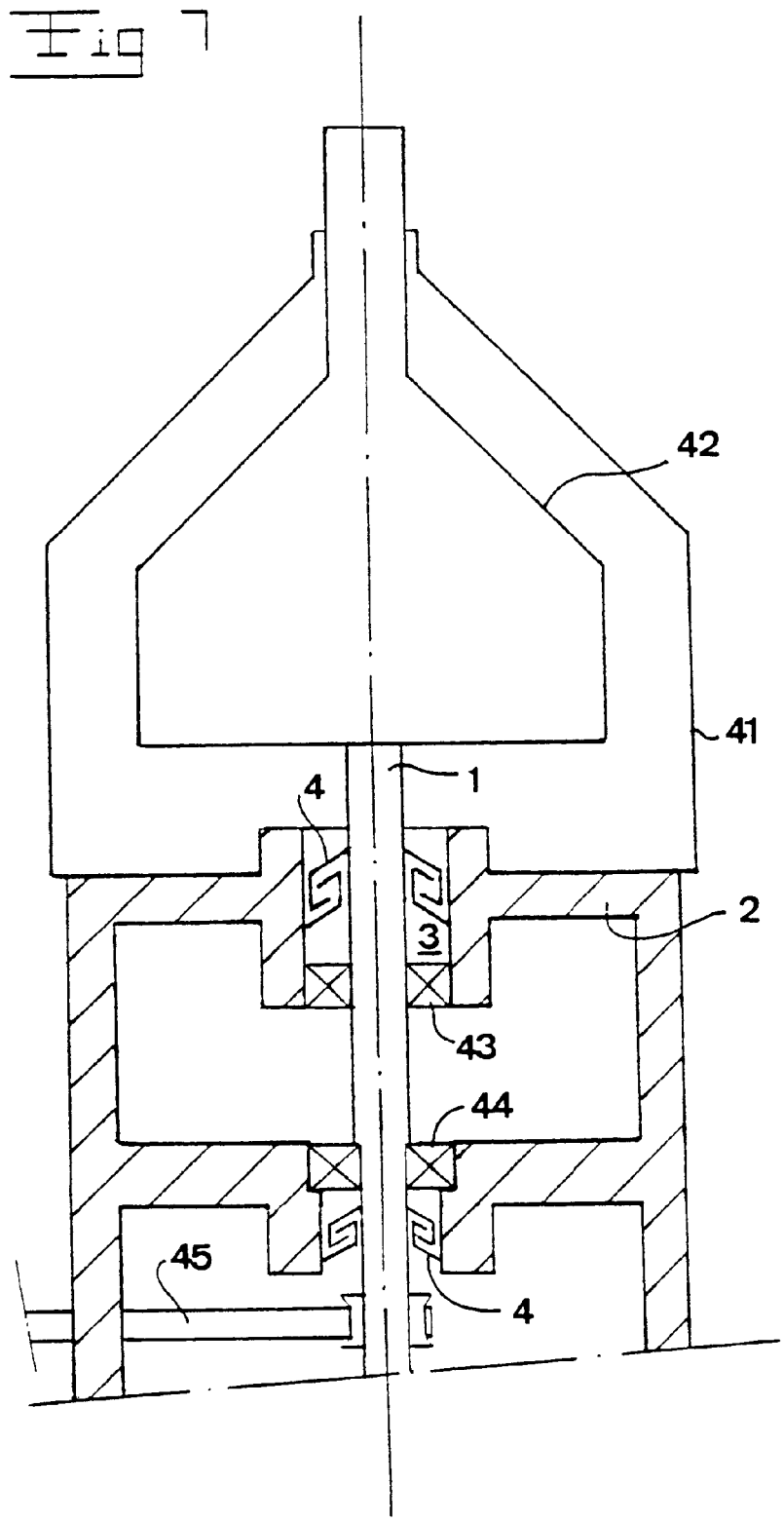

SEALING DEVICE

THE BACKGROUND OF THE INVENTION AND PRIOR ART

The present invention refers to sealing devices of the labyrinth type, i.e. co-operating sealing elements are not abutting each other but there is a gap therebetween. In particular, the invention refers to a sealing device for sealing a gap between a first member and a second member, the first member being rotatable in relation to the second member about an axis of rotation, and one of the two members forming a cavity within itself, in which the other of the two members extends axially and thereby forms said gap between the two members, the sealing device comprising a first sealing element, having a first attachment member arranged to be fixedly provided on the first member and extend around the axis of rotation and from the first member extend towards the second member, and a second sealing element, having a second attachment member arranged to be fixedly provided on the second member and extend around the axis of rotation and from the second member extend towards the first member closely adjacent to the first sealing element without direct contact with the latter and with the first member.

In many technical constructions and applications, it is a problem to provide a sealing which is sufficiently good due to the clearances which have to exist between two members being rotatable relative to each other. One example of such an application is centrifugal separators having a support and a driving shaft extending through a stationary wall into the space in which the centrifugal separator rotates. Due to the high number of revolutions of the driving shaft and its frequently large radial movements, lip sealings or other abutting machine sealings may not be used, but contact free sealing devices such as labyrinth sealings are often the only alternative. In addition, since there may be a pressure difference between said space and the surroundings, it is very difficult to avoid a certain flow through the labyrinth sealing. This means that unwanted particles and liquids will be transported by the flow.

GB-A-2 157 373 discloses a conventional labyrinth sealing for sealing a passage for a rotating shaft. The labyrinth sealing comprises a first sealing element which is intended to be provided at the shaft and which comprises a number of flanges extending radially outwardly, and a second sealing element which comprises a number of flanges extending radially inwardly in the spaces between the flanges of the first sealing element.

DE-A-3 908 372 discloses a similar conventional labyrinth sealing comprising rotating and stationary, respectively, flanges provided adjacent to each other and extending in radial planes.

U.S. Pat. No. 5,085,443 discloses a floating labyrinth sealing for a centrifugal separator. The sealing comprises a number of teeth extending in the peripheral direction and axially and radially, respectively, towards a rotating shaft and enclosing a number of chambers. The intermediate chamber is connected to a channel for the supply of nitrogen gas.

GB-A-2 128 693 discloses another type of labyrinth sealing which is intended for sealing a rotating shaft and which comprises chambers delimited in the peripheral direction.

DE-A-4 313 805 discloses a sealing device for a turbine and in particular for the turbine shaft passage through the turbine housing. The sealing device comprises a number of chambers which are provided adjacent to each other in the passage and which enclose and are open towards the turbine shaft. A suction device is arranged for sucking away the gas or steam entering the chambers.

U.S. Pat. No. 5,026,075 discloses a radial labyrinth sealing for a turbine device. The sealing comprises radial flanges provided at the turbine housing and radial flanges provided at the turbine rotor and extending between the flanges of the turbine housing. Furthermore, this document discloses the arrangement that the flanges of the rotor are provided with projecting sealing portions, the outer ends of which are located very close to the turbine part, making the sealing disclosed inappropriate when relatively radial movements occur between the rotating and stationary parts.

SUMMARY OF THE INVENTION

The object of the present invention is to provide a sealing device enabling an effective sealing of a gap between two members which are rotatable relative to each other, and simultaneously permitting relative movements between these members. Furthermore, it is aimed at a sealing device which effectively prevents particles or liquid droplets present in a fluid, such as a gas, from passing through the gap.

This object is obtained by the sealing device initially defined, which is characterized in that the first sealing element comprises a first flange member enclosing the axis of rotation, which member is fixedly connected to a part of the first attachment member facing the second member and extends towards the first member in such a manner that the first attachment member together with the first flange member forms a first chamber enclosing the axis of rotation, which chamber is open towards the first member leaving a first gap, enclosing the axis of rotation, between the first flange member and the first member, that the second sealing element comprises a second flange member enclosing the axis of rotation, which member is fixedly connected to a part of the second attachment member facing the first member and extends towards the second member in such a manner that the second attachment member together with the second flange member forms a second chamber enclosing the axis of rotation, which chamber is open towards the second member leaving a second gap, enclosing the axis of rotation, between the second flange member and the second member, and that the first and second flange members are provided in such a manner overlapping each other that the first flange member extends through the second gap and towards the first member in the second chamber and the second flange member extends through the first gap and towards the second member in the first chamber.

By such sealing elements a very good sealing function is obtained since they give a very great flow resistance to the medium which is to be prevented from passing the sealing device. Furthermore, by such sealing elements, a pumping action may be obtained by providing the sealing elements non-symmetrically. Consequently, the sealing device according to the invention gives a possibility to counteract a flow due to a pressure difference between the spaces delimited by the sealing device or to provide a flow between these spaces in a desired direction. Furthermore, the medium which in the actual case passes through the sealing device will be forced into a complicated path in such a manner that a great pressure drop arises across the sealing device. In addition, it is possible to separate possible liquid droplets or particles present in a medium and penetrating the sealing device, since these particles or droplets are captured in the first chamber and displaced radially outwardly by the centrifugal force and collected in the radially outward portion of the chamber. Thus, the sealing device according to the invention prevents very effectively particles and/or liquid droplets from passing through the sealing device.

Advantageous embodiments of the invention are defined in the dependent claims 2 to 15.

According to such an embodiment of the invention the sealing device also comprises a third sealing element comprising a third attachment member, which is arranged to be fixedly provided on the first member and extend around the axis of rotation and from the first member to extend towards the second member, and comprising a third flange member enclosing the axis of rotation, which member is fixedly connected to a part of the third attachment member facing the second member and extends towards the first member in such a manner that the third attachment member together with the third flange member forms a third chamber enclosing the axis of rotation, which chamber is open towards the first member leaving a third gap, enclosing the axis of rotation, between the third flange member and the first member, and a fourth sealing element comprising a fourth attachment member, which is arranged to be fixedly provided on the second member and extend around the axis of rotation and from the second member to extend towards the first member, and comprising a fourth flange member enclosing the axis of rotation, which member is fixedly connected to a part of the fourth attachment member facing the first member and extends towards the second member in such a manner that the fourth attachment member together with the fourth flange member forms a fourth chamber enclosing the axis of rotation, which chamber is open towards the second member leaving a fourth gap, enclosing the axis of rotation, between the fourth flange member and the second member, wherein the third and fourth flange members are provided in such a manner overlapping each other that the third flange member extends through the fourth gap and towards the first member in the fourth chamber and the fourth flange member extends through the third gap and towards the second member in the third chamber, which communicates with the first chamber via the first gap and the third gap.

Such a sealing device is symmetrical, i.e. it does not demonstrate any pumping action in any direction, and thus seals effectively in both directions. By providing two pairs of sealing elements in this manner, a sealing device is obtained, which may capture particles in a possible gas flow through the sealing device equally well in both directions. This is especially obtained by the fact that both pairs of sealing elements are symmetrically provided, for instance if the sealing device in its both axial ends comprises a rotating sealing element provided at a rotor. By this embodiment either the first attachment member of the first sealing element may be the third attachment member of the third sealing element or the second attachment member of the second sealing element may be the fourth attachment member of the fourth sealing element.

According to a further embodiment of the invention, at least one of said chambers is open essentially radially inwardly and communicates via a hole provided in a radially outer part of the sealing element, forming this chamber, with said cavity. By such a hole, the liquid and the possible particles collected in the first chamber may be drained therefrom and be carried back to the space from where they came.

The present invention may be used in a number of different applications. Thereby, the second member may either be stationary or rotatable with another number of revolutions than the first member. In such advantageous applications of the invention, the first member may be a rotating element of a centrifugal separator and/or the second member may be a wall element of a centrifugal separator.

BRIEF DESCRIPTION OF THE DRAWINGS

The present invention is now to be explained more closely by means of different embodiments, disclosed by way of example, and with reference to the drawings attached.

FIG. 1 discloses a first embodiment of the sealing device according to the invention.

FIG. 2 discloses a second embodiment of the sealing device according to the invention.

FIG. 3 discloses a third embodiment of the sealing device according to the invention.

FIG. 4 discloses a fourth embodiment of the sealing device according to the invention.

FIG. 5 discloses a fifth embodiment of the sealing device according to the invention.

FIG. 6 discloses a sixth embodiment of the sealing device according to the invention.

FIG. 7 discloses a partly sectional side view of a centrifugal separator having a sealing device according to the invention.

DETAILED DESCRIPTION OF DIFFERENT EMBODIMENTS

Figure 8:
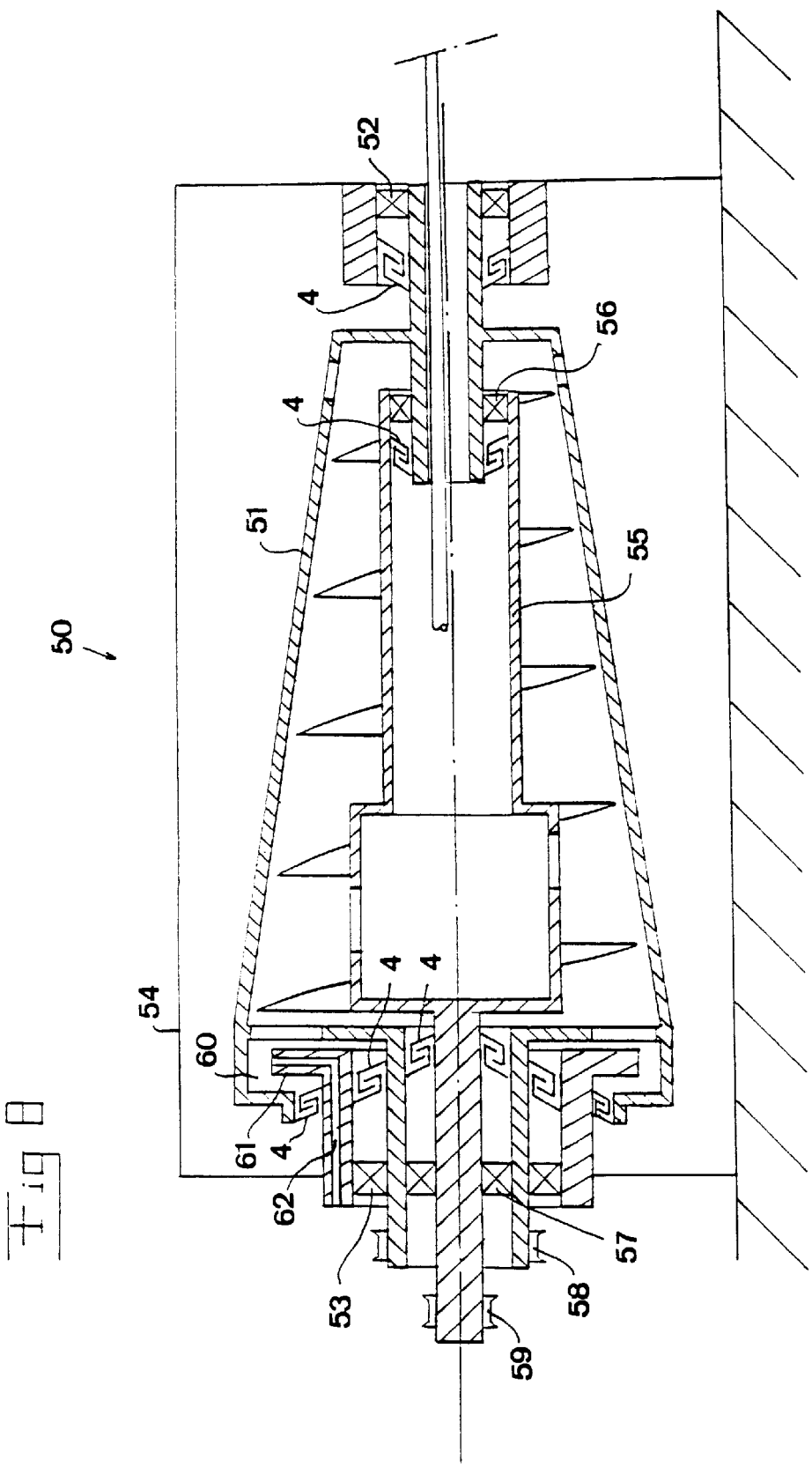
FIG. 8 discloses a longitudinal sectional view of a decanter centrifuge having several sealing devices according to the invention.

FIG. 1 discloses a first member 1 which may be a shaft being rotatable about an axis of rotation x and in relation to a second member 2 which may be a wall element. The wall element 2 has a cavity 3 in the shape of a passage through which the shaft 1 extends in such a manner that there is formed a gap enclosing the shaft 1 and provided between the shaft 1 and the wall element 2. It is to be noted that, in the embodiments disclosed, although the shaft 1 is rotatable and the wall element 2 is stationary, the invention may also refer to stationary shafts having an enclosing rotating member, or rotatable shafts having an enclosing member rotating with a different speed, compare for instance the application of the invention disclosed below in FIG. 8.

In the gap formed between the shaft 1 and the wall element 2, a sealing device 4 according to the invention is provided. In the detailed description of the sealing device 4, it will, for the sake of simplicity, be referred to the shaft 1 and the wall element 2. The sealing device 4 comprises a first sealing element 10 which is fixedly attached to the shaft 1 and a second sealing element 20 which is fixedly attached to the wall element 2. The first sealing element 10 comprises an attachment member 11 which is shaped as a disk or flange having a surface extending around the shaft 1 and essentially radially outwardly with respect to the axis of rotation x, i.e. said surface extends outwardly from the axis of rotation x by an angle v which is about 90°. At the radially outward end of the attachment member 11 a flange member 12 is provided, which extends essentially axially outwardly from the surface of the attachment member 11 and radially inwardly in the direction towards the shaft 1 in such a manner that the first sealing element 10 forms an annular first chamber 13 enclosing the shaft 1 and delimited radially outwardly. As appears from FIG. 1, the flange member 12 comprises an essentially circular cylindrical portion, the cylinder axis of which coincides with the axis of rotation x, and an essentially radial portion. The essentially radial portion of the flange member 12 extends inwardly towards the shaft 1 so far that an annular gap 14, enclosing the axis of rotation x is formed at the radial inner end of the chamber 13. In the circular cylindrical portion of the flange member 12, one or several holes 15 are provided. These may be circular or elongated and extend in the peripheral direction. As appears from FIG. 1, the second sealing element 20 is constructed in a similar way as the first sealing element 10. Thus, the second sealing element 20 comprises an attachment member 21 which is shaped as a disk or flange having a surface extending around the shaft 1 and radially inwardly in the direction towards the shaft 1. Furthermore, the second sealing element 20 comprises a flange member 22 extending essentially axially outwardly from the surface of the attachment member 21 by an essentially circular cylindrical portion and radially outwardly in the direction away from the shaft 1 by an essentially radially portion in such a manner that the second sealing element 20 forms an annular second chamber 23 enclosing the shaft 1 and being delimited radially inwardly. The essentially radial portion of the flange member 22 extends towards the wall element 2 so far that an annular gap 24, enclosing the axis of rotation x, is formed at the radially outer end of the chamber 23. Both the first and the second chambers 13, 23 are located between the two attachment members 11, 21, the two sealing elements 10 and 20 being provided in an overlapping configuration in such a manner that the essentially radial portion of the flange member 12 is located in the second chamber 23 and the essentially radial portion of the flange member 22 is located in the first chamber 13. Thereby, the essentially radial portion of the flange member 12 extends essentially centrally in the second chamber 23, i.e. essentially half-way between the attachment member 21 and the essentially radial portion of the flange member 22, and the essentially radial portion of the flange member 22 extends essentially centrally in the first chamber 13, i.e. essentially half-way between the attachment member 11 and the essentially radial portion of the flange member 12.

When the shaft 1 rotates, the medium present in the area of the sealing device 4 will be brought to rotate and thereby particles and possible liquid droplets will be collected in the radially outer portion of the first chamber 13 due to the centrifugal force. It is to be noted that the sealing capacity of the sealing device 4 and the effect with respect to the prevention of the passage of liquid droplets and particles therethrough thus will increase with an increasing number of revolutions of the shaft 1 and the rotating sealing element 10. In order to prevent the first chamber 13 from being filled by such collections the chamber 13 may be drained off through the holes 15 and the material collected may be returned to the area outside the sealing device 4.

FIG. 2 discloses a second embodiment of the invention, which is similar to the one in FIG. 1 but having an angle v being acute. It is to be noted that for elements having a corresponding function, the same reference signs have been used in all disclosed embodiments of the sealing device. The surfaces of the essentially radial portions and the surfaces of the attachment members 11 and 21 all comprise an essentially rectilinear generatrice intersecting the axis of rotation x by a common angle v. The angle v is in the embodiment disclosed in FIG. 2 about equal to 60°. However, it is to be noted that this angle may vary from greater than 0° to less than 180°. It is also to be noted that the generatrice according to alternative embodiments may be curved.

The embodiments disclosed in FIGS. 1 and 2 comprise a non-symmetrical sealing device 4, i.e. it seals essentially in one direction. Furthermore, it is possible to provide a pumping action by such a non-symmetrical embodiment, i.e. the sealing device tends to force a flow through the passage. The sealing devices 4 disclosed in FIGS. 1 and 2 will furthermore effectively prevent liquid droplets or particles from passing the passage 3 from above and downwardly.

FIG. 3 discloses a third embodiment of the sealing device 4, which comprises sealing elements 10 and 20 which are essentially identical to those disclosed in FIG. 2, and a third sealing element 30 which is fixedly provided at the shaft 1 axially beside the second sealing element 20 and comprising a conical disk or flange 31 extending around the shaft 1 and radially outwardly from the axis of rotation x by the same conical angle v as the conical parts of the sealing elements 10 and 20. Thanks to the third sealing element 30 the non-symmetrical construction or function of the sealing device 4 is reduced in comparison with the embodiments disclosed in FIGS. 1 and 2. This means that the pumping action of the sealing device 4 disclosed in FIG. 3 is relatively small at the same time as it effectively will capture liquid droplets and/or particles and thus prevent these from passing the passage from above and downwardly.

FIG. 4 discloses a fourth embodiment of the sealing device according to the invention with two pairs of sealing elements 10, 20, and 10', 20' symmetrically provided. The two pairs are provided in such a manner that the annular gaps 14 and 14+, and 24 and 24+, respectively, enclosing the axis of rotation, are located opposite to each other. Thus, the sealing elements 10 and 10' comprise a respective conical attachment member 11 and 11' having a respective flange member 12 and 12'. Each of the flange members 12 and 12' comprise a circular cylindrical portion and a conical portion, which form an annular third chamber 13' enclosing the axis of rotation x. The circular cylindrical portions of the flange members 12 and 12' both comprise drainage holes 15 and 15'. The sealing elements 20 and 20' have a common attachment member 21 from which two flange members 22 and 22' extend by a respective circular cylindrical portion and a respective conical portion and thus form a second annular chamber 23 enclosing the axis of rotation x, and a fourth annular chamber 23' enclosing the axis of rotation, respectively. The flange members 22 and 22' extend in a respective separate direction through the gaps 14 and 14+, respectively. The embodiments disclosed in FIG. 4 thus comprise a symmetrical sealing device 4, which means that it seals effectively in both directions and thus does not give rise to any pumping action. It seals with respect to liquid droplets and particles in both directions and hence will effectively prevent liquid droplets or particles from passing the passage from both directions.

FIG. 5 discloses a fifth embodiment of the sealing device 4 according to the invention with two pairs of sealing elements 10, 20 and 10+, 20+, respectively, symmetrically provided. The two pairs are provided in such a manner that the gaps 14 and 14+, and 24 and 24+, respectively, enclosing the axis of rotation x, are located opposite to each other. The sealing elements 10 and 10' have a common attachment member 11 from which two flange members 12 and 12' extend by a respective circular cylindrical portion and a respective conical portion. The flange members 12 and 12' extend in a respective separate direction through the gaps 24 and 24+, respectively. The circular cylindrical portions of the flange members 12 and 12' both comprise drainage holes 15 and 15'. The sealing elements 20 and 20' comprise a respective conical attachment member 21 and 21' having a respective flange member 22 and 22'. Each of the flange members 22 and 22' comprise a circular cylindrical portion and a conical portion, which form a second and a fourth chamber 23 and 23'. Furthermore, this fifth embodiment comprises a drainage channel 25 extending through the attachment member 21, 21' of the second sealing element 20, 20' and the wall element 2. Through the drainage channel 25 the liquid from the channels 15, 15' may be effectively drained. Thus, the embodiment disclosed in FIG. 5 also comprises a symmetrical sealing device 4, which means that it seals effectively in both directions and thus does not give rise to any pumping action. It seals with respect to liquid droplets and particles in both directions and will thus effectively prevent liquid droplets or particles from passing the passage from both directions.

FIG. 6 discloses a sixth embodiment of the sealing device, which differs from the second embodiment according to FIG. 2 by each of the flange members 12 and 22 comprising two conical portions which are provided axially displaced from each other and which extend from the essentially circular cylindrical portion of the respective flange member 12, 22. In such a manner each sealing element 10 and 20 forms two chambers 13a, 13b and 23a, 23b provided axially beside each other and enclosing the axis of rotation x. Also in this case the sealing elements 10 and 20 are provided in an overlapping configuration to each other in such a manner that the two conical portions of the flange member 12 extend in a respective chamber 23a and 23b of the second sealing element 20 and that the two conical portions of the flange member 22 extend in a respective chamber 13a and 13b of the first sealing element 10. The embodiment according to FIG. 6 is thus non-symmetrical but has a good flow sealing capacity since it offers a significant resistance for a flow from passing. It ought to be clear that each sealing element 10 and 20 also may comprise more than two conical portions of each flange member 12 and 22 and consequently form more than two chambers 13, 23 enclosing the axis of rotation.

FIG. 7 discloses schematically a centrifugal separator 40 which comprises a support 2 and a casing 41 provided at the support and enclosing a centrifugal rotor 42. The rotor 42 is supported by a driving shaft 1 rotating about an essentially vertical axis of rotation x extending through a passage 3 in the support 2 and being journalled in an upper bearing 43 and a lower bearing 44. The rotor 42 and the driving shaft 1 are driven by means of a driving member which in the example disclosed comprises a driving-belt 45. The centrifugal separator 40 may of course also comprise other types of driving members, for example a worm gear. A sealing device 4 according to the present invention is provided in the passage 3 between the driving shaft 1 and the support 2 at the bearing 43 and at the bearing 44.

FIG. 8 discloses another centrifugal separator 50 in the shape of a so-called decanter centrifuge comprising a rotor 51 which is rotatably journalled at 52 and 53 in a casing 54 enclosing the rotor 51. In the inner space of the rotor 51, a transport screw 55 is rotatably journalled at 56 and 57. The decanter 50 comprises pulleys 58, 59 for the drive of the rotor 51 and the transport screw 55, respectively, i.e. both the rotor 51 and the transport screw 55 are rotatable about an essentially vertical axis of rotation x in relation to the housing 54 and the transport screw may rotate by a different speed than the rotor 51, which means that these are rotatable relative to each other. In one end of the rotor 51 a chamber 60 is enclosed in which a paring disk 61 extends. The paring disk 61 comprises at least one discharge channel 62. At each bearing 52, 53, 56, 57, a sealing device 4 according to the present invention is provided, as well as between the rotor 51 and the central part of the paring disk 61.

The invention is not limited to the embodiments disclosed herein but may be varied and modified within the scope of the following claims. For instance, it is to be noted that all conical parts of the embodiments disclosed do not necessarily need to slope by the same conical angle v. Furthermore, it is to be noted that the different flanges and portions of each sealing element may be formed by separate parts which are mounted together during the mounting of the sealing device 4. In order to enable mounting, each sealing element 10, 20 may be divided along an axial dividing plane. The different sealing elements 10, 20 may be separate units which may be mounted to different sealing devices 4 in a symmetrical or asymmetrical configuration in order to provide a proper sealing function for a particular case and in order to provide a pumping action in a certain direction, for example in order to counteract a great pressure difference between the spaces enclosing the sealing device. Furthermore, the sealing device 4 according to the invention may be provided with many successively provided sealing elements in order to improve the sealing effect in such a manner. Although the sealing device 4 according to the invention merely has been disclosed in connection with centrifugal separators, it is clear that it may be utilized in a number of different other applications.

What is claimed is:

1. A labyrinth sealing device for sealing a gap between a first member (1) and a second member (2), the first member (1) being rotatable in relation to the second member (2) about an axis of rotation (x), and one of the two members (2) forming a cavity within itself, in which the other of the two members (1) extends axially and thereby forms said gap between the two members (1, 2), the labyrinth sealing device (4) comprising a first sealing element (10), having a first attachment member (11) arranged to be fixedly provided on the first member (1) and extend around the axis of rotation (x) and from the first member (1) extend towards the second member (2), and a second sealing element (20), having a second attachment member (21) arranged to be fixedly provided on the second member (2) and extend around the axis of rotation (x) and from the second member (2) extend towards the first member (1) closely adjacent to the first sealing element (10) without direct contact with the latter and with the first member (1)

wherein the first sealing element (10) comprises a first flange member (12) enclosing the axis of rotation (x), which member is fixedly connected to a part of the first attachment member (11) facing the second member (2) and extends towards the first member (1) in such a manner that the first attachment member (11) together with the first flange member (12) forms a first chamber (13) enclosing the axis of rotation (x), which chamber is open towards the first member (1) leaving a first gap (14), enclosing the axis of rotation (x), between the first flange member (12) and the first member (1), further wherein the second sealing element (20) comprises a second flange member (22) enclosing the axis of rotation (x), which member is fixedly connected to a part of the second attachment member (21) facing the first member (1) and extends towards the second member (2) in such a manner that the second attachment member (21) together with the second flange member (22) forms a second chamber (23) enclosing the axis of rotation (x), which chamber is open towards the second member (2) leaving a second gap (24), enclosing the axis of rotation (x), between the second flange member (22) and the second member (2), and further wherein the first and second flange members (12 and 22, respectively) are provided in such a manner overlapping each other that the first flange member (12) extends through the second gap (24) and towards the first member (1) in the second chamber (23) and the second flange member (22) extends through the first gap (14) and towards the second member (2) in the first chamber (13).

2. A sealing device according to claim 1, further comprising a third sealing element (10') comprising a third attachment member (11'), which is arranged to be fixedly provided on the first member (1) and extend around the axis of rotation (x) and from the first member (1) to extend towards the second member (2), and comprising a third flange member (12') enclosing the axis of rotation (x), which member is fixedly connected to a part of the third attachment member (11') facing the second member (2) and extends towards the first member (1) in such a manner that the third attachment member (11') together with the third flange member (12') forms a third chamber (13') enclosing the axis of rotation (x), which chamber is open towards the first member (1) leaving a third gap (14'), enclosing the axis of rotation (x), between the third flange member (12') and the first member (1), and a fourth sealing element (20') comprising a fourth attachment member (21'), which is arranged to be fixedly provided on the second member (2) and extend around the axis of rotation (x) and from the second member (2) to extend towards the first member (1), and comprising a fourth flange member (22') enclosing the axis of rotation (x), which member is fixedly connected to a part of the fourth attachment member (21') facing the first member (1) and extends towards the second member (2) in such a manner that the fourth attachment member (21') together with the fourth flange member forms a fourth chamber (23') enclosing the axis of rotation (x), which chamber is open towards the second member (2) leaving a fourth gap (24'), enclosing the axis of rotation (x), between the fourth flange member (22') and the second member (2), wherein the third and fourth flange members (12' and 22+, respectively) are provided in such a manner overlapping each other that the third flange member (12') extends through the fourth gap (24') and towards the first member (1) in the fourth chamber (23') and the fourth flange member (22') extends through the third gap (14') and towards the second member (2) in the third chamber (13'), which communicates with the first chamber (13) via the first gap (14) and the third gap (14').

3. A sealing device according to claim 2, wherein the first attachment member (11) of the first sealing element (10) also is the third attachment member of the third sealing element (10').

4. A sealing device according to claim 2, wherein the second attachment member (21) of the second sealing element (20) also is the fourth attachment member of the fourth sealing element (20').

5. A sealing device according to claim 1 comprising a further sealing element (30), which is arranged to be provided at an axial end of the sealing device fixedly connected to one of the two members (1, 2) and which comprises a disk member (1) enclosing the axis of rotation (x) and extending towards the other of the two members (1, 2) leaving a passage (32), enclosing the axis of rotation, between the disk member and the other of the two members (1, 2).

6. A sealing device according to claim 5, wherein the disk member (31) is arranged to be fixedly connected to the first member (1).

7. A sealing device according to claim 2 wherein at least one chamber (13, 23, 13+, 23') formed by a sealing element (10, 20, 10+, 20') is axially defined by two surfaces, enclosing the axis of rotation (x), at least one of which is conical and forms an acute angle with said axis of rotation (x).

8. A sealing device according to claim 1 wherein one sealing element (10, 20) forms an annular chamber (23) enclosing the axis of rotation (x) and being axially defined by two surfaces, enclosing the axis of rotation (x), at least one of which is essentially planar and extends perpendicular to said axis of rotation (x).

9. A sealing device according to claim 1 wherein at least one of the flange members (12, 22) comprises an essentially circular cylindrical part connecting to the associated attachment member (11, 21).

10. A sealing device according to claim 1 wherein at least one of said chambers (13, 13') is open essentially radially inwardly and communicates via a hole (15) provided in a radially outer part of the sealing element (10, 10'), forming this chamber (13, 13'), with said cavity (3).

11. A sealing device according to claim 1 wherein the second member (2) is stationary.

12. A sealing device according to claim 1 wherein the second member (2) is rotatable by another number of revolutions than the first member (1).

13. A sealing device according to claim 1 wherein said cavity (3) is formed in the second member (2).

14. A sealing device according to claim 1 wherein the first member (1) is a rotating element (1, 42) of a centrifugal separator (40).

15. A sealing device according to claim 1 wherein said second member (2) is a wall member (2, 41) of a centrifugal separator (40).

* * * * *

UNITED STATES PATENT AND TRADEMARK OFFICE
CERTIFICATE OF CORRECTION

PATENT NO. : 6,155,574
DATED : December 5, 2000
INVENTOR(S) : Borgstrom et al.

It is certified that error appears in the above-identified patent and that said Letters Patent is hereby corrected as shown below:

<u>Column 6,</u>
Line 29, change "14+" to -- 14' --; and change "24+" to -- 24' --.
Line 45, change "14+" to -- 14' --
Line 55, change "10+, 20+" to -- 10', 20' --.
Line 57, change "14+" to -- 14' --; and change "24+" to -- 24' --.
Line 64, change "24+" to -- 24' --.

<u>Column 10,</u>
Line 13, change "(1)" to -- (31) --.
Line 19, change "claim 2" to -- claim 1 --.
Line 20, change "13+" to -- 13' --.
Line 21, change "10+" to -- 10' --.

Signed and Sealed this

Sixth Day of November, 2001

Attest:

NICHOLAS P. GODICI
Attesting Officer
*Acting Director of the United States Patent and Trademark Office*